US008359911B2

(12) United States Patent
Grunwald et al.

(10) Patent No.: US 8,359,911 B2
(45) Date of Patent: Jan. 29, 2013

(54) METHOD FOR CHECKING THE FUNCTION OF A TANK VENTING VALVE

(75) Inventors: Oliver Grunwald, Ingolstadt (DE); Siegfried Meixner, Hofstetten (DE); Peter Enders, Munich (DE)

(73) Assignee: Audi, AG, Ingolstadt (DE)

( * ) Notice: Subject to any disclaimer, the term of this patent is extended or adjusted under 35 U.S.C. 154(b) by 465 days.

(21) Appl. No.: 12/641,522

(22) Filed: Dec. 18, 2009

(65) Prior Publication Data

US 2010/0162804 A1 Jul. 1, 2010

(30) Foreign Application Priority Data

Dec. 20, 2008 (DE) ........................ 10 2008 064 345

(51) Int. Cl.
*G01M 15/00* (2006.01)

(52) U.S. Cl. .................................................. 73/114.39

(58) Field of Classification Search ............... 73/114.38, 73/114.39, 114.42, 114.77
See application file for complete search history.

(56) References Cited

U.S. PATENT DOCUMENTS

| | | | | |
|---|---|---|---|---|
| 6,631,635 | B2 * | 10/2003 | Hanazaki et al. | 73/114.39 |
| 7,017,402 | B2 * | 3/2006 | Kagleder | 73/114.39 |
| 7,941,280 | B2 * | 5/2011 | Wild | 702/34 |
| 2002/0189596 | A1 * | 12/2002 | Hanazaki et al. | 123/520 |
| 2004/0040537 | A1 * | 3/2004 | Esteghlal et al. | 123/339.11 |
| 2004/0173011 | A1 * | 9/2004 | Nakoji | 73/118.1 |
| 2004/0226353 | A1 * | 11/2004 | Yamaguchi et al. | 73/118.1 |
| 2004/0231404 | A1 * | 11/2004 | Yamaguchi et al. | 73/118.1 |
| 2005/0034513 | A1 * | 2/2005 | Streib et al. | 73/118.1 |
| 2005/0050949 | A1 * | 3/2005 | Esteghlal et al. | 73/118.1 |
| 2010/0095747 | A1 * | 4/2010 | Grunwald | 73/49.2 |
| 2010/0101541 | A1 * | 4/2010 | Grunwald et al. | 123/518 |

FOREIGN PATENT DOCUMENTS

| | | | |
|---|---|---|---|
| DE | 4342431 | A1 | 6/1995 |
| DE | 10043071 | A1 | 3/2002 |
| DE | 10150420 | A1 | 4/2003 |
| DE | 10324813 | A1 | 1/2005 |
| DE | 102005049068 | A1 | 4/2007 |
| DE | 102006034807 | A1 | 1/2008 |

* cited by examiner

*Primary Examiner* — Eric S McCall
(74) *Attorney, Agent, or Firm* — Novak Druce + Quigg LLP

(57) ABSTRACT

The invention relates to a method for checking the function of a tank venting valve between the intake manifold of an internal combustion engine and a fuel tank or a fuel vapor reservoir in which the tank venting valve in operation of the internal combustion engine is opened several times and is closed again after a short opening time and in which during repeated opening and closing the time characteristic of a quantity which is dependent on the opening state of the tank venting valve is recorded. In order to enable a reliable function check of the tank venting valve even in the case of very small and/or time-shifted amplitudes of the quantity to be monitored, it is proposed, according to the invention, that the first derivative of the time characteristic of the quantity be evaluated.

18 Claims, 3 Drawing Sheets

METHOD FOR CHECKING THE FUNCTION OF A TANK VENTING VALVE

CROSS-REFERENCE TO RELATED APPLICATIONS

This application claims priority from German Application No. 10 2008 06 345.9 filed Dec. 20, 2008, hereby incorporated by reference in its entirety.

The invention relates to a method for checking the function of a tank venting valve.

BACKGROUND OF THE INVENTION

To prevent fuel vapors from the fuel tanks of motor vehicles whose internal combustion engines are operated with gasoline from escaping into the environment, in most countries tank ventilation systems are mandated for those vehicles with which the fuel tank is vented and the fuel vapors from the fuel tank are supplied to the intake manifold of the internal combustion engine for combustion in it. Tank ventilation systems generally comprise a fuel vapor reservoir in the form of an activated charcoal-filled reservoir tank which communicates with the fuel tank, through which air from the exterior can be intaken into the intake manifold of the internal combustion engine for regeneration of the activated charcoal. To initiate regeneration, a normally closed regeneration valve which is conventionally referred to as a tank venting valve in the connecting line between the fuel vapor reservoir and the intake manifold is opened. Since, in the case of a defect or problem of the tank venting valve, regeneration of the activated charcoal is not possible, proper operation of the tank venting valve must be regularly checked in order to detect a defect or problem early on and to prevent escape of fuel vapors into the environment by replacing the valve.

Methods for checking the function of a tank venting valve are disclosed, for example, in DE 100 43 071 A1, DE 103 24 813 A1, DE 10 2005 049 068 A1 and DE 10 2006 034 807 A1. In the method of the initially known type disclosed in DE 103 24 813 A1, the tank venting valve in the operating state of the internal combustion engine is repeatedly opened in order to supply to the internal combustion engine the stored fuel vapor from the fuel vapor reservoir and to detect the reaction of the fuel/air ratio control circuit to the opening of the tank venting valve in order to deduce therefrom the function of the tank venting valve.

As in the method described in DE 103 24 813 A1, the quantity which is dependent on the opening state of the tank venting valve is often the fuel/air ratio in the exhaust gas flow of the internal combustion engine which is measured and evaluated by means of a lambda probe. Since additional fuel/air mixture is delivered into the intake manifold and thus to combustion when the tank venting valve has been opened, the $\lambda$ value in the exhaust gas flow briefly changes.

In addition to the fuel-air ratio in the exhaust gas flow, however, other system or controller variables can also be monitored, such as, for example, the change of the induction pipe pressure in the intake manifold of the internal combustion engine when the tank venting valve is opened or closed, or the change of the energy flow via the throttle valve according to DE 100 43 071 A1, this energy flow being the product of the air flowing through the throttle valve and the efficiency with which this air is burned after mixing with fuel.

The changes are usually compared to a threshold value, proper operation of the tank venting valve being deduced when the change exceeds a threshold value, while a defect or malfunction is assumed when the change does not exceed the threshold value.

The function check of the tank venting valve is generally done when the internal combustion engine is idling, where constant operating conditions prevail over a longer time interval; this facilitates evaluation of the quantity which is to be monitored. But the function check can also be done according to DE 10 2005 049 068 A1 during active tank ventilation operation or according to DE 103 24 813 A1 under load, in the latter case operating states with a low load being preferred since changes of the operating condition take place less dynamically there.

Depending on the load state of the internal combustion engine and the quantity to be monitored, its change will follow opening of the tank venting valve with a more or less large time shift.

It is common to the known methods that the quantity to be monitored, such as, for example, the fuel-air ratio in the exhaust gas flow or the induction pipe pressure, can have a very small amplitude; in conjunction with the time shift between the opening of the tank venting valve and the change of the quantity to be monitored this can make the detection of the latter much more difficult or even impossible.

On this basis, the object of the invention is to improve a method of the initially named type such that even in the case of very small and/or time-shifted amplitudes of the quantity to be monitored, a reliable function check of the tank venting valve is possible.

SUMMARY OF THE INVENTION

This object is achieved according to the invention in that the first derivative of the time characteristic of the quantity is evaluated, according to one preferred configuration of the invention the time spans between adjacent zero crossings of the first derivative being determined and compared to the pertinent opening and/or closing times of the tank venting valve by advantageously difference amounts of the time spans and the pertinent opening and/or closing times being compared to a stipulated threshold value.

The invention is based on the concept that in proper operation of the tank venting valve in the case of repeated opening and closing which follow one another at short time intervals, the quantity to be monitored fluctuates between a number of maxima and minima which corresponds to the number of opening and closing processes, the minima each corresponding to the instant of opening of the tank venting valve and the maxima each corresponding to the instant of closing of the tank venting valve, or vice versa. Since these maxima and minima coincide with the zero crossings of the first derivative of the quantity to be monitored, this means that the time span between two adjacent zero crossings will correspond rather exactly to the pertinent opening and closing time of the tank venting valve. This results in that the time spans between adjacent zero crossings of the first derivative of the quantity to be monitored have major agreements with the opening or closing times of a properly operating tank venting valve, so that, in a comparison of the time spans and the pertinent opening and closing times, the stipulated threshold value will not be exceeded.

If, conversely, the tank venting valve in the case of a defect or a problem no longer opens or no longer closes, the maxima and minima in the time characteristic of the quantity to be monitored and thus also the time spans between adjacent zero crossings of the first derivative of this quantity are not in a measurable correlation to the instants at which the tank venting valve is actuated for opening or closing. This means that in a comparison of the time spans between adjacent zero crossings of the first derivative of the quantity to be monitored and the controlled opening and closing time of the tank venting valve, very often the stipulated threshold value will be exceeded.

The method according to the invention is much more robust than the known methods in which the quantity itself to be monitored is always evaluated, and not its first derivative. Moreover, the method according to the invention makes it possible to carry out a function check even in load states of the internal combustion engine in which with the known methods a function check of the tank venting valve is not possible or is possible only to a very limited degree. This is especially advantageous in motor vehicles with hybrid drive and automatic start-stop, where the internal combustion engine at rest or in driving states with low load is turned off; this makes a function check of the tank venting valve impossible during idling or under low load.

Another advantage of the method according to the invention consists in that only a very small application effort is necessary since the time span used for evaluation between adjacent zero crossings of the first derivative of the quantity to be monitored is independent of the controller parameters or controller data which are selected in the control system for control of the internal combustion engine, while in the known methods, after a change of controller parameters or controller data, the threshold value with which the quantity to be monitored is compared must be re-determined.

According to one preferred configuration of the invention, the opening times of the tank venting valve are chosen such that they are in a predetermined ratio to the closing times. When this ratio is advantageously chosen to be equal to 1:1, i.e., the opening time corresponds to the closing time, any pairs of adjacent zero crossings of the first derivative of the quantity to the monitored can be determined and compared to the opening times of the tank venting valve.

Moreover, this procedure has the advantage that potential zero crossings of the first derivative which are not caused by a maximum or minimum but by a continuously rising or falling curve segment with a local slope of zero as a result of the deviation of the determined time span to the adjacent zero crossing can be easily recognized as an outlier and can be ignored in the evaluation. To detect zero crossings of the first derivative without a genuine minimum or maximum however, in the evaluation the second derivative of the quantity to be monitored can be used.

When a ratio not equal to 1:1 is chosen, those pairs of zero crossings must be isolated between which the tank venting valve is closed; this, however, likewise poses no problems as a result of the different durations of the closing and opening times.

To ensure that outliers remain ignored, another advantageous configuration of the invention calls for the comparison of the time spans between adjacent zero crossings of the first derivative and the opening times of the tank venting valve to be repeated several times, improper function of the tank venting valve being deduced only in those cases in which either the average of the difference amounts of the determined time spans and the pertinent opening and/or closing times exceeds the threshold value or where the proportion of the times the threshold value is exceeded by individual difference amounts is above a given boundary value.

This means that proper function of the tank venting valve is advantageously deduced when the difference amounts between the determined time spans and the pertinent opening and/or closing times of the tank venting valve always or almost always fail to reach a given threshold value, while improper operation of the tank venting valve is deduced when the difference amounts between the determined time spans and the pertinent opening and/or closing times of the tank venting valve more often exceed a given threshold value.

Another preferred configuration of the invention calls for the opening and/or closing times of the tank venting valve to be changed in a predetermined pattern in order to enable simpler assignment of the opening and/or closing time to the recorded quantity or its first derivative in the case of a time shift between the opening and/or closing times and the recorded quantity. Furthermore, the opening and closing times of the tank venting valve are advantageously changed depending on the instantaneous air mass flow rate through the intake manifold.

In order to improve the accuracy of the method, it is possible, instead of the time behavior of a quantity which is dependent on the opening state of the tank venting valve, to record the time characteristic of several such quantities and to evaluate their first derivatives.

Opening and closing of the tank venting valve in operation of the internal combustion engine and recording of the time characteristic of the quantity(ies) dependent on the opening state of the tank venting valve are advantageously undertaken only under constant operating conditions; this can take place both in idle and also under load.

The quantity which is dependent on the opening state of the tank venting valve is preferably the fuel/air ratio which is measured in the exhaust gas line of the internal combustion engine, but can also be, for example, the induction pipe pressure measured in the intake manifold of the internal combustion engine, the output signal of a throttle valve controller or the output signal of a mixture controller.

DETAILED DESCRIPTION OF THE PREFERRED EMBODIMENTS OF THE INVENTION

Figure 1:
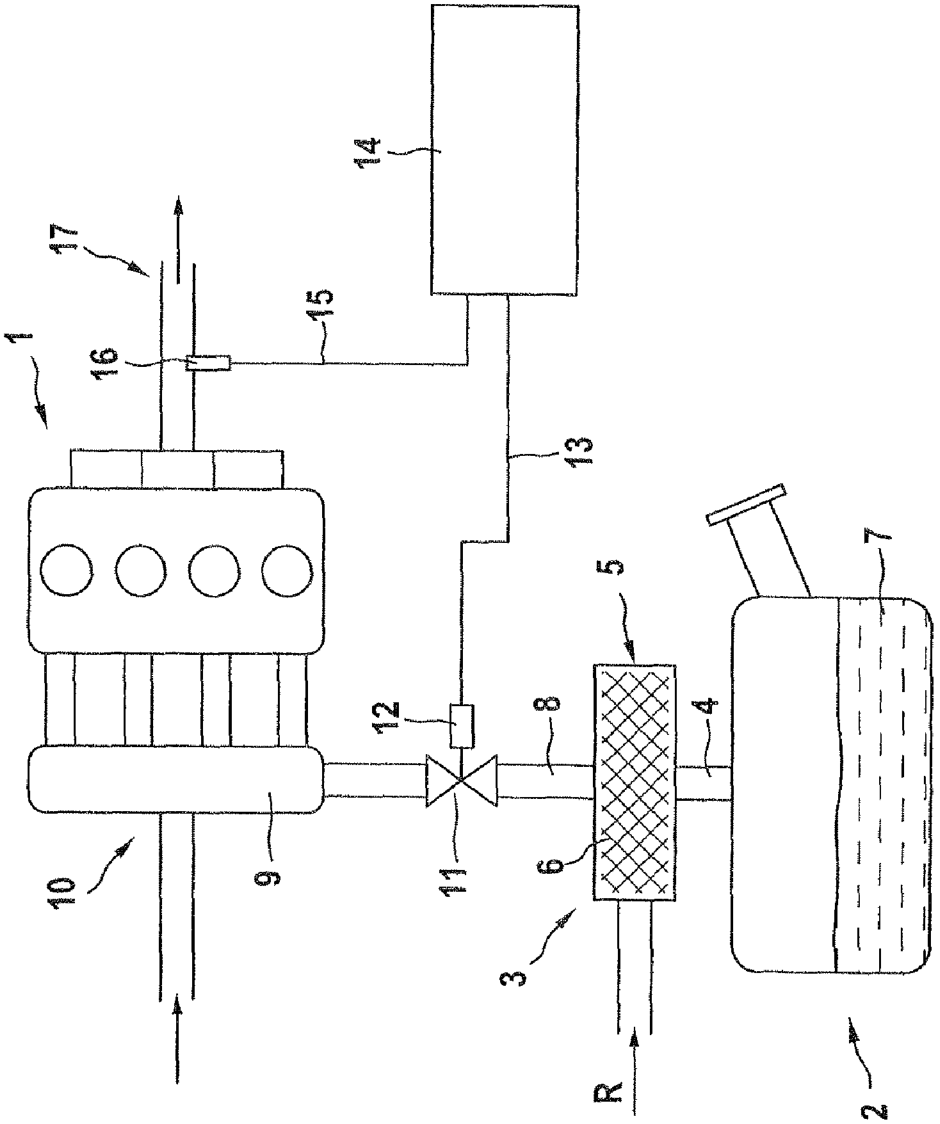
FIG. 1 shows a schematic of the internal combustion engine of a motor vehicle with a fuel tank and a tank venting valve.

The internal combustion engine 1 of a motor vehicle shown schematically in FIG. 1 is supplied with gasoline from a fuel tank 2. The fuel tank 2 has a tank ventilation system 3 which comprises a fuel vapor reservoir 5 which is connected to the fuel tank 2 by way of a tank venting line 4, and activated charcoal 6 which is located within the fuel vapor reservoir 5. The activated charcoal 6 is used to capture fuel vapors which collect above the liquid fuel 7 in the fuel tank 2 and then travel into the fuel vapor reservoir 5 via the tank venting line 4.

To enable regeneration of the activated charcoal 6, the fuel vapor reservoir 5 is connected by a regeneration line 8 to the induction pipe 9 of the intake manifold 10 of the internal combustion engine 1. The regeneration line 8 contains a controllable tank venting valve 11 whose actuating element 12 is connected via a signal line 13 to a regeneration and diagnosis module 14 of the tank ventilation system 3, which module is used for regenerating the activated charcoal 6 and for checking the operation of the tank venting valve 11.

For regeneration of the activated charcoal 6, the tank venting valve 11 is opened by the diagnosis module 14 to intake air from the exterior through the fuel vapor reservoir 5 into the induction pipe 9, as is shown by arrow R in FIG. 1, the fuel vapors stored by the activated charcoal 6 being released to the intaken ambient air and being supplied with it to combustion in the internal combustion engine 1.

To check the function of the tank venting valve 11, the diagnosis module 14 is connected via another signal line 15 to a lambda probe 16 in the exhaust gas line 17 of the internal combustion engine 1, with which the fuel/air ratio in the exhaust gas line 17 is continuously measured. An output signal of the lambda probe 16 is continuously transmitted to the diagnosis module 14 where it can be evaluated for checking the function of the tank venting valve 11.

Figure 2:
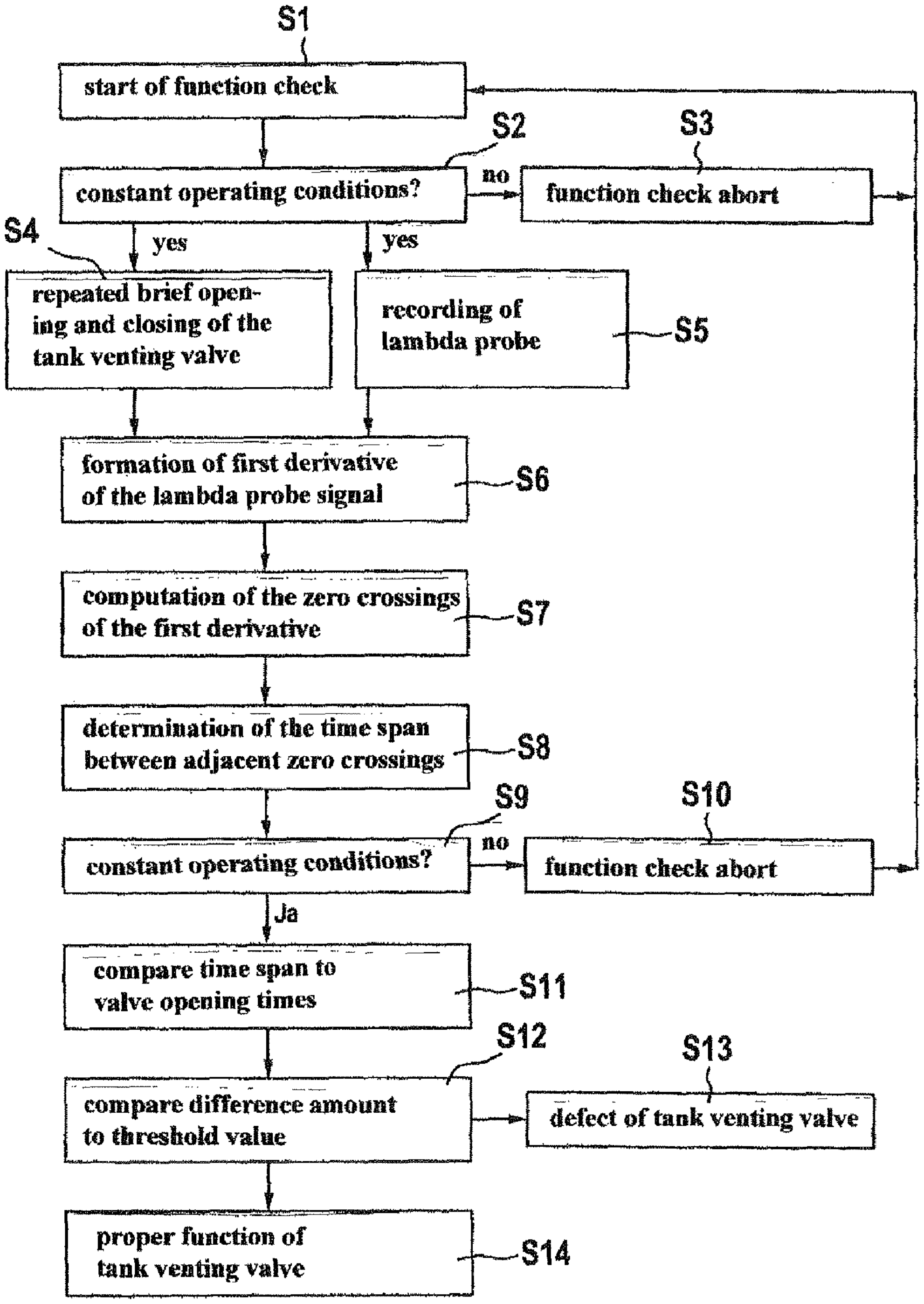
FIG. 2 shows a flow chart of a method for function checking of the tank venting valve of a tank ventilation system.

The method for checking the function of the tank venting valve 11 is described below with reference to FIG. 2.

After the function check has been started in the first step S1, in the second step S2 it is checked whether the internal combustion engine 1 is working under constant operating conditions. If this is not the case, in a third step S3 the function check is aborted and restarted with step S1 after a specified time interval.

Figure 3:
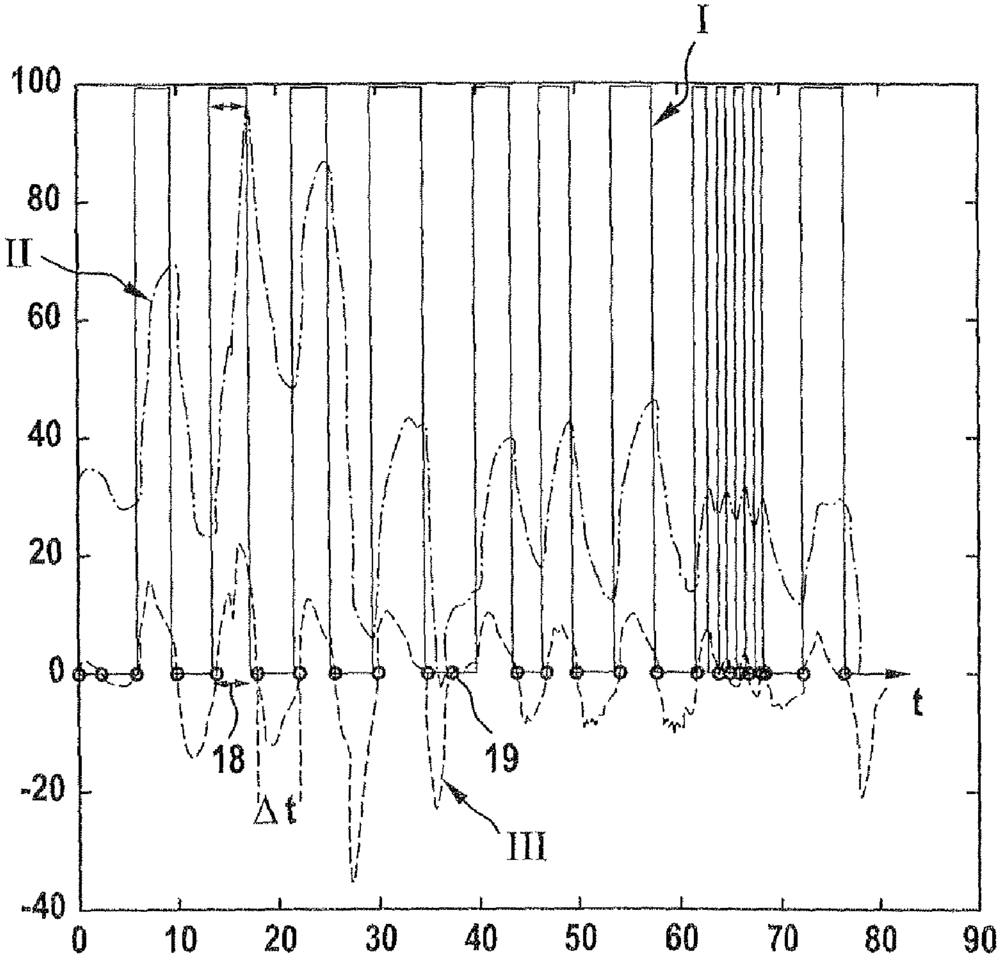
FIG. 3 shows a chart of the relation determined by measurement between the opening and closing times of the tank venting valve and a quantity or its first derivative which is dependent on the opening state.

If the internal combustion engine 1 is working under constant operating conditions, in a fourth step S4 the tank venting valve 11 is repeatedly opened and closed for a short time in a special pattern depending on the current air mass flow rate under the control of the diagnosis module 14. In the process, the diagnosis module 14 records the alternating opening and closing times of the valve 11, as shown in FIG. 3 by the rectangular curve I, in which a value of 100% represents a completely opened tank venting valve 11 and a value of 0% represents a completely closed tank venting valve 11. In the pattern shown in FIG. 3, the opening times of the tank venting valve 11 which are shown by way of example by a double arrow 18 are in a time ratio of 1:1 with the respectively following closing time.

During repeated opening and closing of the tank venting valve 11, at the same time with the fourth step S4, in the fifth step S5 in the diagnosis module 14 the output signal transmitted from the lambda probe 16 is recorded with the measured fuel/air ratio in the exhaust gas flow, as is shown by curve II in FIG. 3.

In the following sixth step S6, the diagnosis module 14 for evaluation computes the first derivative of the curve II, i.e., of the recorded fuel/air ratio in the exhaust gas flow during repeated opening and closing of the tank venting valve 11, this derivative being shown in FIG. 3 by curve III.

After computing the first derivative, in the seventh step S7 the zero crossings of the first derivative are computed at which the slope of curve II is zero. These zero crossings which in FIG. 3 lie on the horizontal time axis t and are identified by a circle in the direction of the horizontal time axis t coincide with a high correlation with the minima and maxima of the fuel/air ratio in curve II, in FIG. 3 aside from a single zero crossing 19 which corresponds to the local slope of zero along an ascending segment of the curve II.

The diagnosis module 14 in the eighth step S8 then determines the respective time span Δt between two adjacent zero crossings and in a ninth step S9 again ascertains whether the internal combustion engine 1 is working under constant operating conditions. When the operating conditions change, the function check in the tenth step S10 is aborted and after a predetermined time interval is restarted with step S1, while in the case of constant operating conditions in the eleventh step S11 the determined time spans Δt between the adjacent zero crossings of the first derivative are compared to the pertinent opening times of the tank venting valve 11.

For comparison of the determined time spans Δt between adjacent zero crossings of the first derivative with the opening times of the tank venting valve 11, in step S11 the difference D between the opening time of the tank venting valve 11 and the pertinent time span Δt between adjacent zero crossings of the first derivative is formed, and where the special pattern of opening and closing times belongs which comprises both somewhat longer and somewhat shorter opening and closing times, as shown in FIG. 3, can be determined.

In the following twelfth step S12 the amount |D| of this difference D is formed and it is ascertained whether the amount |D| is above or below a predetermined threshold valve S, i.e., whether |D|>S or |D|<S.

After steps S2 to S12 have been repeated several times, in a thirteenth step S13 a defect of the tank venting valve is deduced when the amount is frequently above the threshold value, while in a fourteenth step S14 proper function of the tank venting valve 11 is deduced when the amount of the difference which has been formed in step S12 only rarely or never exceeds the threshold value.

The invention claimed is:

1. A method for checking the function of a tank venting valve between an intake manifold of an internal combustion engine and a fuel tank or a fuel vapor reservoir, the method comprising;

- opening the tank venting valve during operation of the internal combustion engine several times and closing again after a short opening time; and
- recording during repeated opening and closing, a time characteristic of a quantity dependent on the opening state of the tank venting valve,
- determining time spans (Δt) between adjacent zero crossings of first derivative of the time characteristic; and
- comparing each of the determined time spans to the short opening time of the tank venting valve.

2. The method according to claim 1, wherein the calculating step determines difference amounts |D| of the time spans (Δt) and the pertinent opening and/or closing times, and wherein the method further comprises comparing the difference amounts to a threshold value (S).

3. The method according to claim 2 wherein proper function of the tank venting valve is deduced when the difference amounts |D| always or almost always fail to reach the threshold value (S).

4. The method according to claim 2 wherein improper function of the tank venting valve is deduced when the difference amounts |D| more often exceed the threshold value (S).

5. The method according to claim 1 wherein the successive opening and/or dosing times of the tank venting valve during recording of the quantity which is dependent on the opening state of the tank venting valve are in a fixed ratio.

6. The method according to claim 5 wherein the ratio of successive opening and closing times of the tank venting valve during recording of the quantity which is dependent on the opening state of the tank venting valve is 1:1.

7. The method according to claim 1 wherein the opening and/or closing times of the tank venting valve are changed during the recording of the quantity which is dependent on the opening state of the tank venting valve.

8. The method according to claim 7 wherein the opening and/or closing times of the tank venting valve are changed depending on the instantaneous air mass flow rate through the intake manifold of the internal combustion engine.

9. The method according to claim 7 wherein the opening and/or closing times of the tank venting valve are changed in a special pattern.

10. The method according to claim 1 the time characteristic of several quantities which are dependent on the opening state of the tank venting valve is monitored, and that the first derivatives of the time characteristic of several quantities are evaluated.

11. The method according to claim 1 wherein the opening and closing of the tank venting valve in the operation of the internal combustion engine and the monitoring of the time characteristic of the quantity which is dependent on the opening state of the tank venting valve are undertaken under constant operating conditions.

12. The method according to claim 1 wherein the opening and closing of the tank venting valve and the monitoring of the time characteristic of the quantity which is dependent on the opening state of the tank venting valve are undertaken in idling of the internal combustion engine.

13. The method according to claim 1 the opening and closing of the tank venting valve and the monitoring of the time characteristic of the quantity which is dependent on the opening state of the tank venting valve are undertaken under load.

14. The method according to claim 1 wherein the quantity which is dependent on the opening state of the tank venting valve is the fuel/air ratio which has been measured in the exhaust gas line of the internal combustion engine.

15. The method according to claim 1 wherein the quantity which is dependent on the opening state of the tank venting valve is the induction pipe pressure which is measured in the intake manifold of the internal combustion engine.

16. The method according to claim 1 wherein the quantity which is dependent on the opening state of the tank venting valve is the output signal of a throttle valve controller.

17. The method according to claim 1 wherein the quantity which is dependent on the opening state of the tank venting valve is the output signal of a mixture regulator.

18. A method of checking the function of a tank ventilating valve between the intake manifold of an internal combustion engine and one of a fuel tank and a fuel vapor reservoir, comprising;

starting the engine;

determining whether the engine is operating under constant conditions;

repeatedly, briefly opening and closing the tank venting valve while the engine is operating under constant operating conditions;

recording the signals of a lambda probe in the exhaust line of the engine, simultaneously while opening and closing the tank venting valve;

forming a first derivation of the lambda probe signal;

computing zero crossings of the first derivative;

determining a time span between adjacent zero crossings;

assuring continued constant operating conditions of the engine;

comparing the time span to the opening times of the tank ventilating valve; and comparing the time span difference to a threshold value.

* * * * *

UNITED STATES PATENT AND TRADEMARK OFFICE

CERTIFICATE OF CORRECTION

PATENT NO. : 8,359,911 B2
APPLICATION NO. : 12/641522
DATED : January 29, 2013
INVENTOR(S) : Grunwald et al.

It is certified that error appears in the above-identified patent and that said Letters Patent is hereby corrected as shown below:

In the Claims:

Claim 5: Column 6, line 53: should read --…opening and/or closing times of the tank…--

Claim 10: Column 7, line 4: should read --…The method according to claim 1 wherein the time…--

Claim 13: Column 7, line 21: should read --…The method according to claim 1 wherein the time…--

Signed and Sealed this
Twenty-first Day of May, 2013

Teresa Stanek Rea
*Acting Director of the United States Patent and Trademark Office*